UNITED STATES PATENT OFFICE.

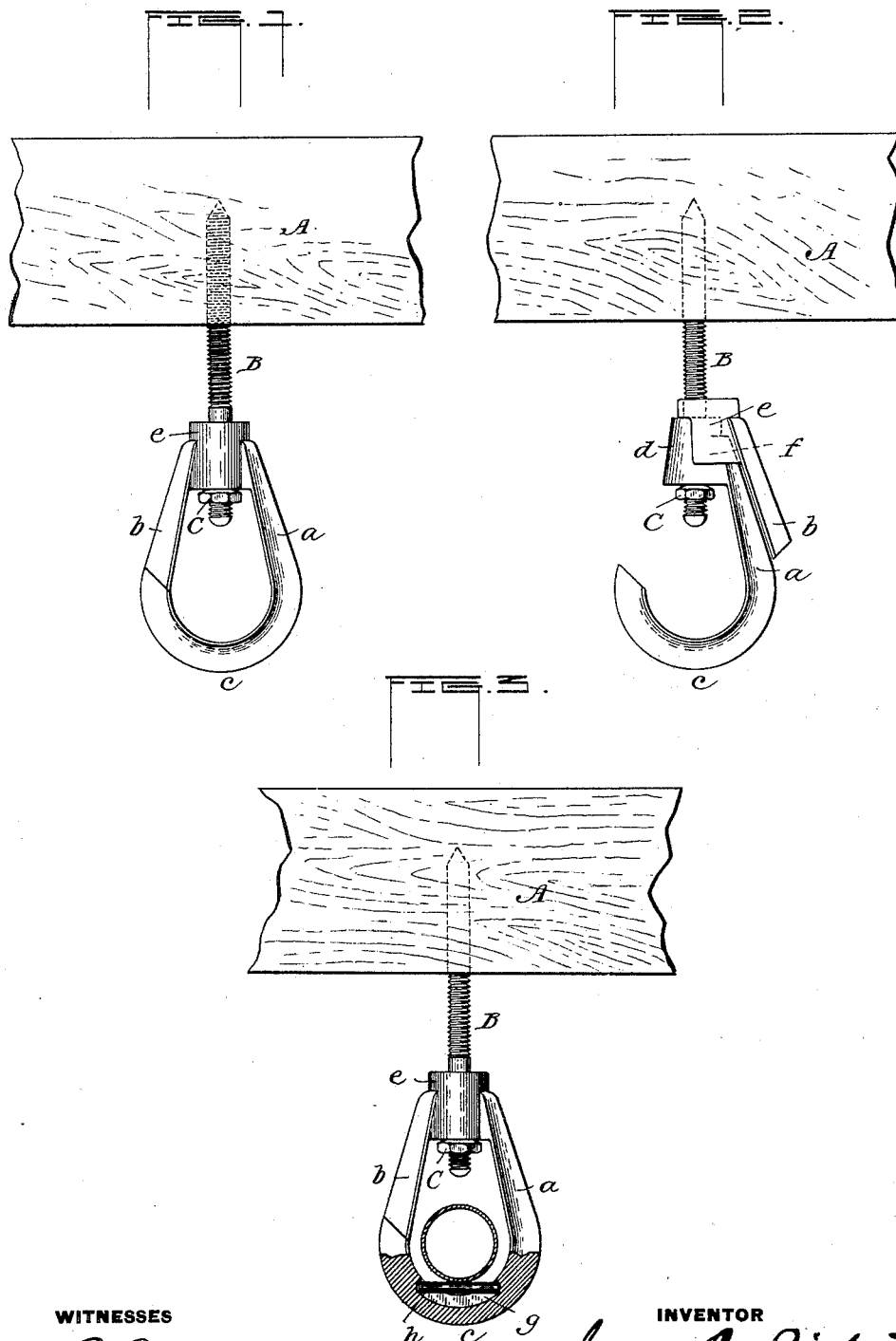

JAMES W. BIRKETT, OF BROOKLYN, NEW YORK.

PIPE-HANGER.

SPECIFICATION forming part of Letters Patent No. 462,616, dated November 3, 1891.

Application filed December 27, 1890. Serial No. 375,923. (Model.)

*To all whom it may concern:*

Be it known that I, JAMES W. BIRKETT, a citizen of the United States, residing at Brooklyn, in the county of Kings and State of New York, have invented certain new and useful Improvements in Pipe-Hangers, of which the following is a description, reference being had to the accompanying drawings, and to the letters of reference marked thereon.

My invention relates to an improvement in pipe or shaft hangers. Heretofore many devices for this purpose have been proposed; but all are more or less defective. For example, with one form it is impossible to adjust the height of the hanger after the pipe has been placed upon the same, it being necessary to turn the entire hanger in order to raise or lower it to bring the line of pipe to the proper level. Another form, composed of sections, has been proposed, in which the height may be adjusted after the pipe is placed in approximate position; but this arrangement is defective by reason of the fact that the hanger cannot be placed in position until the pipe is laid therein—that is, the sections of hanger must be placed around the pipe before the former is secured to its supporting-beam, thus rendering it necessary for the operator to support both pipe and hanger and close the sections together in one continuous operation. It has also been proposed to construct a hanger composed of sections, one pivoted to swing vertically, whereby the pipe may be inserted after the hanger has been placed in position; but with such construction no adjustment is possible without removing the pipe.

My object, therefore, in the present invention is to provide a hanger of such construction that it can first be secured to the ceiling or supporting-beam, the pipe then placed therein in its temporary or approximate position, said hanger, after the line has been formed, being capable of adjustment to the proper level without necessitating the removal of the pipe.

A further object is to provide a construction which shall allow for the expansion and contraction of the line of pipe without causing friction upon the hangers.

The invention therefore consists in the matters hereinafter described, and pointed out in the appended claims.

My invention is illustrated in the accompanying drawings, in which—

Figure 1 is a front elevation of my improved hanger, showing its position when in use. Fig. 2 is a similar view showing the movable section swung around to permit the insertion of a pipe in the hanger. Fig. 3 is a similar view, partly in section, showing the means devised by me for permitting expansion and contraction of the pipe-line without causing injury thereto or to the hanger.

In the drawings, A is the beam secured to the wall or ceiling.

B is the lag-screw or bolt screwed into the under side of said beam and upon which the hanger is supported. The hanger proper is made of any suitable material, preferably cast metal, and in two sections $a\ b$. The section $a$ is longer than the section $b$ and curved at $c$ to afford a bearing surface for the pipe to be hung. The upper end of said section is provided with a shoulder $d$, having an opening through it for the passage of the supporting-bolt or lag-screw, which opening is made somewhat larger in diameter than said supporting-bolt or lag-screw, thus permitting of some play for the hanger and preventing strain upon the screw or bolt. The section $b$ is made of such length as to merely close the opening between the end of the section $a$ and the point where the lag-screw passes therethrough, and formed at its lower end to neatly fit against the upwardly-extending arm of the curved portion thereof. Said section $b$ has also upon its upper end a shoulder $e$, having an opening for the passage of the supporting-bolt. The opening in the shoulder $e$ is preferably large enough to fit down over the upper exterior portion of the shoulder $d$, the latter being rounded to permit of the turning of the section $b$ thereupon. The lower portion of the shoulder $d$ is, however, preferably, but not necessarily, squared; and the shoulder $e$ has a downwardly-extending hood $f$, preferably squared upon its inner surface to correspond with the lower portion of the shoulder $d$, thereby preventing the swinging of the section $b$ when in its lowest position. A nut C upon the lower end of the lag-screw prevents the sections from dropping off, and also serves as a means for adjusting the height of the hanger and consequently that of the pipe-line. This nut is preferably convexed upon its upper surface, where it bears upon the under side of the shoulder of the section a, thus, in connection with the openings in the shoulder of said section, allowing the hanger to swing when the pipe expands or contracts and preventing any strain upon said hanger.

It will be seen that by the construction above described the sections of the hanger can be temporarily attached directly to the ceiling or beams by means of the lag-screws and nut and the line of pipe supported therein while the pipe-sections are being joined, this insertion of the pipes in the hangers being permitted by raising the section b and swinging it laterally to the position shown in Fig. 2. When the pipes are in place, they are lined up by adjustment of the nut C. When this has been done, the section b is swung back to its former position, when it will drop by gravity into position to close the hanger, being held in position by the squared portions of the shoulders d and e.

This invention presents an advantage over all others of its class, in that it can be used as a means to assist in putting up pipe by running a temporary line of hangers, placing the pipe therein, and making the necessary joints, thus doing away with any other means of holding the pipe, such as tying. After making the necessary joints and doing the work through this temporary line all that remains to be done is to tighten the lock-nut and close the hanger without either removing the pipe or supporting the same while closing the sections around the pipe and fastening them upon the lag-screw, as in other constructions.

As a further improvement in devices of this character, I have devised the special feature shown in Fig. 3 for preventing injury to the pipe line or hanger by reason of expansion or contraction of the former. As shown in said figure, the section a is provided with a vertical groove g upon either side of the curved portion c, into which is placed the end of a roller h, adapted to form a bearing for the pipe-line. This roller is preferably a piece of spring-wire, which is forced into place by pressure. By this arrangement, when expansion or contraction of the line takes place it will simply roll through the hangers, thus preventing any strain upon the supports thereof.

Having described my invention, what I claim, and desire to secure by Letters Patent, is—

1. A pipe-hanger composed of two sections having openings at their upper ends, a supporting-bolt passing through said openings, and a nut for holding said sections on the bolt, one of said sections having a hooked lower portion, the other section laterally movable upon the bolt, substantially as described.

2. A pipe-hanger composed of two sections, one curved to afford a bearing surface for the pipe, both of said sections having openings at their upper ends, the shorter section fitting over the top of the lower section and adapted to swing laterally, a supporting-bolt passing through the openings of the sections, and an adjusting-nut upon said bolt, substantially as described.

3. A pipe-hanger composed of two sections of unequal lengths having shoulders provided with openings upon their upper ends, that upon the upper or shorter section fitting over that of the lower, the external surface of the shoulder on the lower section being rounded at the top and squared at the lower portion, and that on the upper section being provided with a downwardly-projecting hood squared on its internal surface, whereby the upper section is prevented from lateral movement until raised a certain distance, a supporting-bolt, and a nut upon the lower end thereof provided with a convex upper surface, substantially as described.

4. A pipe-hanger composed of two sections provided with openings at their upper ends, a supporting-bolt passing through said openings, a nut for holding the sections in place, one of said sections being curved at its lower end and having grooves formed therein, and a spring-roller adapted to be forced into said grooves, substantially as described.

In testimony whereof I affix my signature in presence of two witnesses.

JAMES W. BIRKETT.

Witnesses:
 WM. L. CURTIN,
 CHARLES W. GALLAER.